April 2, 1963 A. N. STANTON 3,083,543
DEVICES AND SYSTEMS FOR COOLING OR HEATING FLUIDS
Filed March 28, 1961 2 Sheets-Sheet 1

INVENTOR
Austin N. Stanton

BY
ATTORNEYS

April 2, 1963 A. N. STANTON 3,083,543
DEVICES AND SYSTEMS FOR COOLING OR HEATING FLUIDS
Filed March 28, 1961 2 Sheets-Sheet 2

INVENTOR
Austin N. Stanton

BY
ATTORNEYS

United States Patent Office 3,083,543
Patented Apr. 2, 1963

3,083,543
DEVICES AND SYSTEMS FOR COOLING OR
HEATING FLUIDS
Austin N. Stanton, Dallas, Tex., assignor to Varo, Inc.
Filed Mar. 28, 1961, Ser. No. 98,899
11 Claims. (Cl. 62—3)

This invention relates to devices and systems for cooling or heating fluids, and more particularly to thermoelectric cooling and heating devices and systems.

An object of this invention is to provide a new and improved device for varying the temperature of fluid in a flow conductor.

Another object is to provide a device which may be selectively operated to either cool or heat the fluid in a flow conductor.

Another object is to provide a flow conductor which is formed of dissimilar thermoelements forming a plurality of inner junctions and a plurality of outer junctions, the annular inner and outer recesses formed by the corrugations between the junctions being filled with an electric and heat insulating substance.

Still another object is to provide a thermoelectric device comprising a flow conductor formed of a plurality of dissimilar thermoelements which are joined together and electrically connected in series to form a plurality of heat absorbing or radiating thermojunctions exposed to the interior of the device and a plurality of heat radiating or absorbing thermojunctions exposed to the exterior of the device whereby the device may be employed to selecitvely cool or heat fluids within the flow conductor.

A further object is to provide a thermoelectric system for cooling and heating fluids connectable with a fluid supply, such as a water pipe, which comprises a pair of flow conductors formed of dissimilar thermoelements connected in parallel to the discharge ends of the water pipe, and jackets surrounding the flow conductors and interconnected with the flow conductors and the water pipe to cause water from the water pipe to flow through the water jacket of each flow conductor before flowing through the other flow conductor whereby the water which is cooled by a first thermoelectric flow conductor is recooled by the absorption of heat by the second thermoelectric flow conductor and the water which is heated by the heat emitted by the second thermoelectric flow conductor is preheated by the first flow conductor.

A still further object is to provide a thermoelectric system for cooling and heating fluids connectable with a fluid supply, such as a water pipe, which comprises a pair of flow conductors formed of dissimilar thermoelements and disposed in coaxial concentric relation, and a water jacket surrounding the flow conductors and interconnected with the bore of the inner flow conductor whereby fluid delivered to the chamber between the inner and outer flow conductors may be heated or cooled by external and internal thermojunctions of the inner and outer flow conductors, respectively, and fluid delivered to the water jacket will be heated or cooled by the external thermojunctions of the outer flow conductor and communicated to the bore of the inner flow conductor where it is further heated or cooled by the internal thermojunctions of the inner flow conductor.

A still further object is to provide a thermoelectric device comprising a flow conductor formed of a plurality of dissimilar thermoelements which are joined together and electrically connected in series to form a plurality of heat absorbing or radiating thermojunctions exposed to the interior of the device and a plurality of heat radiating or absorbing thermojunctions exposed to the exterior of the device wherein external heat radiating or absorbing members are formed adjacent the exterior thermojunctions to increase the transfer of heat from or to the externally exposed cooling and heating thermojunctions.

A still further object is to provide a thermoelectric device comprising a flow conductor formed of a plurality of dissimilar annular thermoelements which are joined together to define a flow passage, one group of dissimilar thermoelements being electrically connected in parallel with a second group of dissimilar thermoelements and the thermoelements in each group being electrically connected in series whereby current flow in the parallel groups will produce thermoelectrically similar thermojunctions in the interior of the flow passage and thermoelectrically similar thermojunctions on the exterior of the device, the interior junctions being thermoelectrically dissimilar from the exterior junctions, whereby the voltage of the electric current for a given heating or cooling effect may be held to a minimum value.

Additional objects and advantages of the invention will be readily apparent from the reading of the following description of a device constructed in accordance with the invention, and with reference to the accompanying drawings thereof, wherein.

Figure 1:
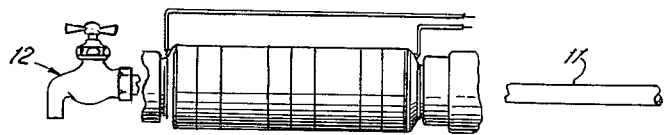
FIGURE 1 is a view of a device embodying the invention, showing the thermoelectric device connected to a flow conductor, such as a water pipe, the dimensions of the thermoelectric device being exaggerated.
Figure 2:
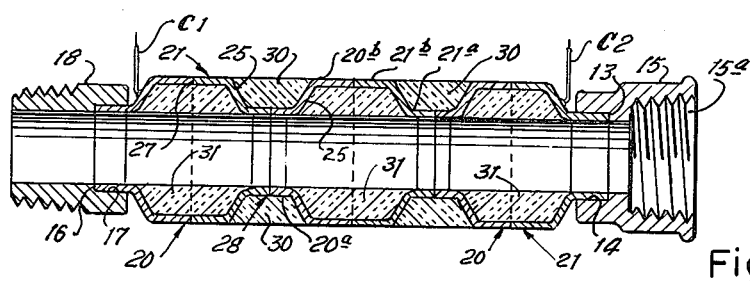
FIGURE 2 is a longitudinal sectional view of a device embodying the invention.

Referring particularly to FIGURES 1 and 2, a device 10 embodying the invention in the form of a thermoelectric flow conductor is shown connected between one end of a flow conductor 11, such as a pipe, and an outlet tap or faucet 12. One end 13 of the device is inserted in an enlarged portion 14 at one end of the bore of a tubular fitting 15 having internal threads 15a at its other end by means of which it is connected to the water pipe 11. The other end 16 of the device is inserted in an enlarged portion 17 at one end of the bore of a tubular fitting 18 which is externally threaded at its other end portion whereby it may be connected to the faucet 12. The fittings 15 and 18 are preferably of material which is electrically and thermally non-conductive, but means may be provided instead for insulating the ends of the thermoelectric device from the fittings.

The device 10 comprises a plurality of alternate thermoelements 20 and 21 of dissimilar characteristics which are electrically connected in series and thermoelectrically coupled. When a current of electricity is caused to flow through the elements there is produced, in accordance with the Peltier effect, an emission or an absorption of heat at the conductive junctions of the dissimilar elements to a degree which is dependent on the kind of metals used and proportional to the current crossing the bi-metallic boundary. With the alternate arrangement of the thermoelements, there is produced a series of alternate heating and cooling junctions. The thermoelements possess a high Peltier coefficient such as exhibited by the metals bismuth and antimony, which have low thermal conductivity and low electrical resistivity, to prevent overheating which tend to counteract the cooling effect at the cooling junctions of the elements.

Other types of substances, of course, may be used in the device instead of bismuth and antimony provided they are thermoelectrically dissimilar. Substances such as bismuth, wherein current flow through the substance causes heat to be pumped in the direction of current flow therethrough are considered as exhibiting positive electrical characteristics and other substances, such as antimony, in which heat will be pumped by these substances in the direction opposite to the flow of current therethrough are considered as exhibiting negative electrical characteristics. Specifically, the thermoelements may comprise such materials as semi-metallic alloys or compositions which exhibit semi-conductor-like conductivity, both electrical and thermal.

Each of the thermoelements 20 includes a pair of longitudinally spaced cylindrical portions 20a and 20b which are coaxial and annular in form. Each of the thermoelements 21 is similarly provided with a pair of spaced cylindrical portions 21a and 21b. Each of the cylindrical portions 20a and 21a is provided with a bore which is substantially equal in diameter to the bore of the flow conductor or pipe to which the device is attached whereas the cylindrical portions 20b and 21b are provided with bores of larger diameters. A frusto-conical portion 25 of each of the elements integrally joins one end of the small cylindrical portions with one end of the large cylindrical portions. The elements 20 and 21, which are thermoelectrically dissimilar, are axially aligned in alternate array and joined at their circular edges of corresponding diameters. Consequently, the series of junctions between the dissimilar elements comprises an alternate series of large diameter and reduced diameter thermojunctions. In addition, because of the alternate arrangement of the dissimilar thermoelements, the junctions also form a series of alternate heating and cooling junctions wherein all of the exterior junctions are heating junctions and all of the interior junctions are cooling junctions, or vice versa, depending on the direction of current flow through the device. It will be apparent that the thermoelectrical elements 20 and 21 form a flow conductor which is corrugated in form providing longitudinally spaced internal annular recesses 27 and external annular recesses 28.

Annular rings 30 of a suitable heat and electric insulating substance, such as nylon or other suitable substance, are formed about the cylindrical portions 20a and 21a and fill the external recesses to insulate these surfaces from the external ambient atmosphere, as shown in FIGURE 2. Similar annular rings 31 of heat and electric insulating substance are provided within the cylindrical portions 20b and 21b and fill the internal recesses 27 thereby insulating these surfaces from fluid with the device. The inner diameters of the annular rings 31 are equal to the inner diameters of the cylindrical portions 20a and 21a so that a uniform diameter bore extends from one end of the alternately joined dissimilar elements to the other end thereof, forming, in effect, a continuation or extension of the bore of the water pipe or flow conductor.

When a direct current from a suitable source, which is preferably adapted to produce low voltage and high amperage, is sent through the device, a series of alternately hot and cold junctions will be formed in accordance with the Peltier effect. In the embodiment of apparatus shown in FIGURE 2, if the elements 20 are of antimony and the elements 21 are of bismuth and current is applied from the conductor C1 to flow through the device to the conductor C2, the antimony to bismuth junctions, as related to the direction of current flow, will become heating junctions and the bismuth to antimony junctions will become cooling junctions. Consequently, the cold thermojunctions in the interior of the device will cause fluid flowing therethrough, when the tap 12 is opened, to be cooled. The outer junctions will of course radiate or emit heat.

From the description above, it will be seen that because of the exposure of the external heating junctions to the ambient atmosphere, the cooling device produces an efficient pump means for absorbing heat from the fluid in the device and radiating or emitting the heat from the external junctions. It will also be apparent, however, that should the current through the device of FIGURE 2 be reversed, there would be a consequent reversal of the hot and cold junctions, with the interior junctions becoming hot, so that the device may be employed to heat fluid flowing therethrough.

Figure 4:
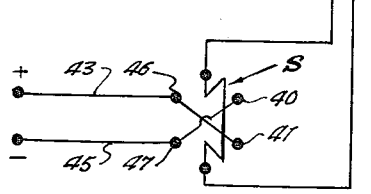
FIGURE 4 is a schematic diagram showing the device of FIGURE 1 provided with a switching means for selectively controlling the direction of current flow through the device to produce either cooling or heating of the fluid in the pipe.

In FIGURE 4, is schematically illustrated a switching means whereby current through the device may be readily reversed to change the device from a fluid heating means to a fluid cooling means, or vice versa. When the switch S, a double pole, double throw switch, is thrown to engage the contacts 40 and 41, the positive side of the direct current voltage supply is connected through the conductors 43 and C1 to one end of the device 10 and the other side of the voltage supply is connected through the conductors 45 and C2 to the opposite end of the device, thereby establishing current flow through the device in the direction from conductor C1 to conductor C2. As previously described, when the elements 20 are of antimony and the elements 21 are of bismuth, the interior junctions become heating junctions and the device becomes a means for heating fluid therein.

However, by reversing the switch S to close with the contacts 46 and 47, the positive side of the direct current voltage supply is connected to the device 10 through the conductors 43 and C2 and the other side of the voltage supply is connected to the device through the condutocrs 45 and C1. In this position of the switch, the device 10 becomes a cooling means for fluid flowing therein instead of a heating means, since the interior junctions are changed to cooling junctions.

Figure 3:
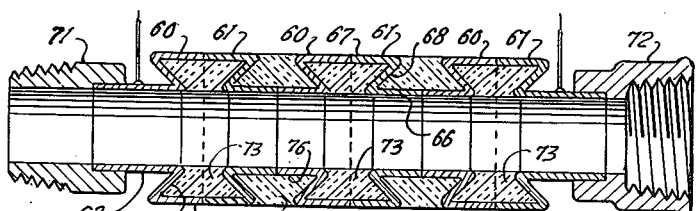
FIGURE 3 is a view similar to FIGURE 2, showing a modified form of device embodying the invention.

A modified form of apparatus embodying the invention is illustrated in FIGURE 3. In this embodiment, the apparatus is similar in arrangement to that illustrated in FIGURE 2, but is designed to expose larger cooling and heating areas at the interior and exterior of the device and to provide for a better mechanical connection for the insulating substance. Each thermoelement 60 includes inner and outer cylindrical portions 62 and 63 integrally joined by a frusto-conical portion 64 which extends angularly and outwardly from one end of the cylindrical portion 62 and partially overlies or encircles the portion 62 and, in turn, is partially encircled by the outer portion 63. The thermoelements 61 are similar in form to the thermoelements 60 with which they are thermoelectrically dissimilar, having inner cylindrical portions 66 connected to outer cylindrical portions 67 by the frusto-conical portions 68. As in the embodiment illustrated in FIGURE 2, the thermoelements are joined at their circular edges of corresponding diameters in alternate array so that relatively large cylindrical surfaces which include thermojunctions of the elements are formed at the interior and the exterior of the device. The end elements of the device however, are provided with small diameter cylindrical portions which are extra long to facilitate connection to fittings or couplings such as 71 and 72, which may, in turn, be connected with tubular flow conductors or pipes. As in the embodiment illustrated in FIGURE 2, the thermojunctions formed by the outer cylindrical portions of the elements 60 and 61 are insulated from the flow channel through the device by means of rings 73 of insulating substance disposed in the internal annular recesses 74. Also rings 75 of insulating substance are disposed in the outer recesses 76 to insulate the interior thermojunctions from the exterior of the device. It will therefore be seen, that with larger areas adjacent the thermojunctions of the thermoelements being exposed to fluid flow through the device and similar large areas exposed to ambient fluid external of the device, a more efficient pumping or transfer of heat is attainable in this embodiment of the apparatus, irrespective of whether the device is used to heat or cool the fluid flowing therethrough and, at the same time, the interiors and outer recesses form dovetails slots which hold the insulating substance more firmly therein.

It will be apparent that the thermoelectric device illustrated in FIGURES 2 and 3 are each in the form of a tubular corrugated flow conductor each of whose corrugations are formed of a pair of thermoelectrically dissimilar substances to provide longitudinally spaced inner and outer thermojunctions for absorbing or emitting heat from the fluid flowing through the flow conductor.

It will further be seen that the thermoelectric devices are simple in mechanical design and may be easily and economically produced.

Figure 5:
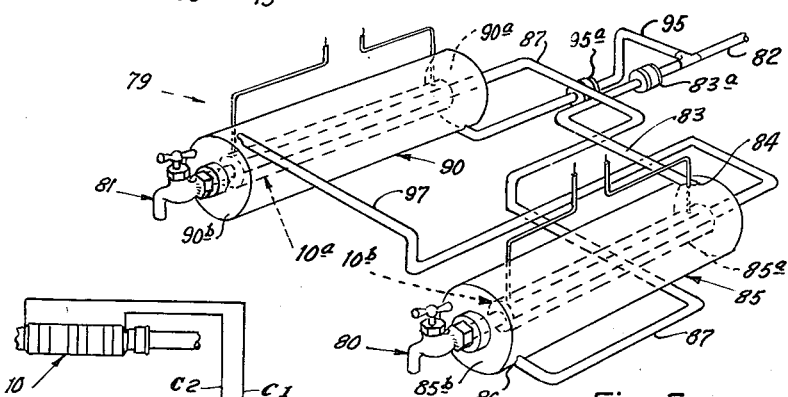
FIGURE 5 is a schematic view of a water cooling and heating system embodying the invention which is connected to a fluid supply line and comprises a pair of taps for delivering hot and cold fluid therefrom, respectively.

The fluid heating and cooling system 79 illustrated in FIGURE 5 includes a pair of hot and cold water taps 80 and 81, respectively, and a pair of the devices 10a and 10b, such as is illustrated in FIGURES 2 and 3, which are electrically connected in parallel so that current may be sent through the devices simultaneously by closing a switch. The devices are so connected that current sent through the device 10a, for example, will produce cold junctions in its interior and hot junctions at its exterior for one position of the switch. The device 10b is electrically connected to produce current flow in a direction through the device 10b so that hot junctions are formed in its interior and cold junctions are formed at its exterior.

Water, from a water supply pipe 82, is delivered to a conduit 83 to an inlet port 84 formed in the wall of a cylinder or jacket 85 which encloses the device 10b. A check valve 83a provided within the conduit 83 prevents reverse flow of fluid in the conduit. The jacket is spaced from the device 10b and is coaxial therewith so as to form an annular chamber between the internal wall of the jacket and the external wall of the device. The ends of the chamber are closed by transverse end portions 85a and 85b of the jacket 85.

Water introduced into the annular chamber of the cylinder 85 and circulated about the external cold junctions of the device 10b is pre-cooled and discharged from the jacket 85 through a port 86 adjacent the end of the jacket remote from the port 84. A conduit 87 connected to the jacket at the port 86 delivers the fluid to one end of the device 10a. The conduit 87 is connected to the device 10a so that their respective bores are in fluid communication with one another. Consequently, cooled water flowing from the device 10b through the conduit 87 is delivered to the interior of the device 10a where it is further cooled by the cold junctions at the interior thereof. Hence, by opening the tap 81, cold water may be delivered from the spigot.

A jacket 90 is spaced about the device 10a and is coaxial therewith so as to form an annular chamber between the jacket and the external wall of the device 10a which chamber is closed by the end members 90a and 90b of the jacket.

A branch conduit 95 connects the fluid supply pipe 82 with the jacket 90 and delivers fluid to the annular chamber of the cylinder through the inlet port 96 at one end of the cylinder. The conduit 95 is provided with a check valve 95a to prevent reverse flow of fluid.

A conduit 97 which connects at the other end of the jacket 90 through a port 98 delivers fluid from the annular chamber to the interior bore of the device 10b to which it is connected in fluid communication. Hence, it will be seen that fluid delivered to the device 10b through jacket 90 is pre-warmed by the external hot junctions of the device 10a. When the tap 80 is opened the pre-warmed fluid flows through the device 10b where it is further heated by the heating junctions in the interior thereof. Consequently, it is thus apparent, that the tap 80 may be opened to deliver hot water at the same time the tap 81 delivers cold water.

It will be noted that the circulating fluids within the annular chambers of the jackets 85 and 90 serve to enhance the functions of the devices 10a and 10b as heat pump means and increase their efficiency. In particular, the ambient fluid in the annular chamber of the jacket 90 readily conducts the heat away from the heat radiating thermojunctions on the exterior of the device 10a so that the device is better able to extract heat from the fluid flowing through its interior. Water, of course, has a relatively great heat capacity per unit volume and so the water in the jacket can absorb relatively great quantities of heat even if the faucet 80 is not open. In similar manner, the fluid within the annular chamber of the jacket 85a provides heat to be absorbed by the outer cold junctions of the device 10b.

It will be noted that the inlet and outlet warm ports of the jackets 85 and 90 are so disposed that relatively warm water is delivered to the upper end of the jacket 85 and cold water leaves through the lower port 86. Similarly, relatively cold water is delivered to the lower end of the jacket 90 through the port 96 and relatively warm water leaves through the upper port 98. The flow of water is thus facilitated by the temperature gradient in the jackets.

It will thus be seen that a combined cooling and heating device has been disclosed which is selectively operable to heat or cool fluids in the interior and the exterior thereof.

It will further be seen from the description above, that an apparatus has been provided for heating and cooling liquid which may be delivered to a pair of outlet faucets.

Figure 6:
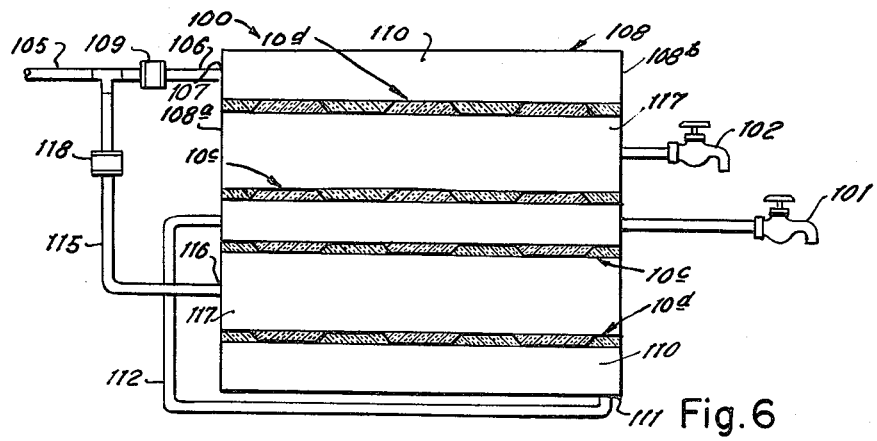
FIGURE 6 is a schematic sectional view of a modified form of liquid cooling and heating system embodying the invention which is connected to a fluid supply line and includes a pair of taps for delivering hot and cold fluid therefrom, respectively.
Figure 7:
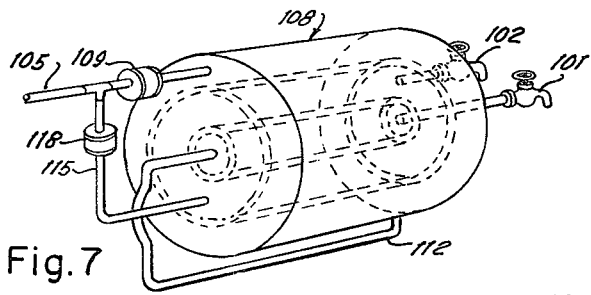
FIGURE 7 is a schematic perspective view of the fluid cooling and heating system illustrated in FIGURE 6.

The modified form of heating and cooling system 100 illustrated in FIGURES 6 and 7 includes a pair of hot and cold water taps 102 and 101, respectively, and a pair of the devices 10c and 10d, such as are illustrated in FIGURES 2 and 3. The pair of devices are disposed in coaxial concentric relation to one another and are electrically connected in parallel. The devices are so connected that current sent through the device 10c, for example, will produce cold junctions in its interior and hot junctions at its exterior. The device 10d is electrically connected in circuit with the device 10c so that current flow through the device 10d will produce hot junctions in its interior and cold junctions at its exterior.

Fluid, such as water, from a supply pipe 105, is delivered through a conduit 106 to an inlet port 107 formed in the end wall of a closed cylinder or jacket 108 which encloses both of the devices 10c and 10d. The jacket is of a substance having good heat and electric insulating characteristics. A check valve 109 connected in the conduit 106 prevents reverse flow of fluid in the conduit. The jacket 108 is of larger diameter than the device 10d and is spaced therefrom to form an annular chamber 110 between the external wall of the device 10d and the internal wall of the jacket. The ends of the chamber are closed by end portions 108a and 108b of the jacket.

Water introduced into the chamber 110 and circulated about the external junctions of the device 10d is pre-cooled and discharged from the chamber through a port 111 at the lower end of the jacket 108 which is remote from the inlet port 107. A conduit 112 connected to the jacket at the port 111 delivers the pre-cooled fluid to one end of the device 10c, the conduit 112 being connected to the device 10c so that their respective bores are in fluid communication with one another. Consequently, pre-cooled water flowing from the chamber about the device 10d is delivered to the interior of the device 10c where it is further cooled by the cold junctions at the interior thereof. Hence, by opening the tap 101, cold water may be obtained from the spigot.

A branch conduit 115 also connects the fluid supply pipe 105 with the jacket 108 and delivers fluid through an inlet port 116 to a second annular chamber 117 defined by the external and internal walls of the spaced coaxial and concentric devices 10c and 10d, respectively, and the end walls 108a and 108b. The conduit 115 is provided with a check valve 118 to prevent reverse flow of fluid. It will thus be seen that water delivered to the chamber 117 will be heated by the heating thermojunctions of both of the devices 10c and 10d. A tap 102, connected with the chamber 117 at the top portion thereof, may then be opened to deliver hot water at the same time the tap 101 delivers cold water.

Figure 8:
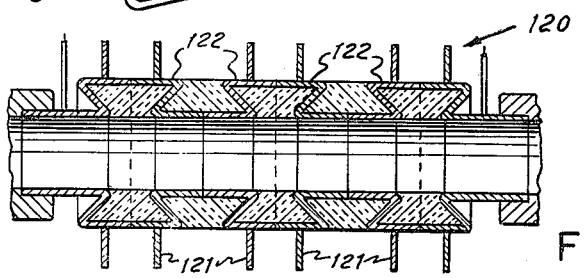
FIGURE 8 is a longitudinal sectional view of another modified form of the device embodying the invention.

A further modified form of fluid heating and cooling device 120 embodying the invention is illustrated in FIGURE 8. In this embodiment, the apparatus is substantially identical to the device illustrated in FIGURE 3. In addition, however, it is provided with radial fins 121 for radiating or absorbing heat. The fins 121 may be annular in form and disposed about the outer cylindrical portions of the thermoelements 122 of the device. As illustrated, one fin is disposed about and is integral with each thermoelement, although the number, of course, may be varied as desired. The fins are preferably integrally formed with the thermoelements to provide a more efficient transfer of heat therebetween.

Figure 9:
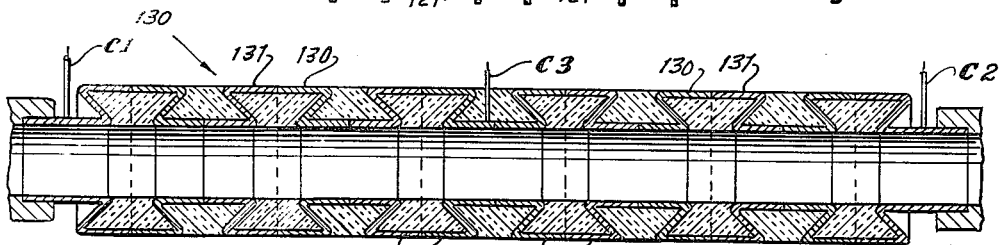
FIGURE 9 is a longitudinal sectional view of still another modified form of the device.

Still another modified form of fluid heating and cooling device 130 embodying the invention is illustrated in FIGURE 9. The thermoelements, for example of bismuth and antimony, are illustrated in the same form as the corresponding elements in the fluid heating and cooling device illustrated in FIGURE 3, although, if desired, they may be of the form illustrated in FIGURE 2. In the device 130, a pair of conductors C1 and C2 are connected at the ends thereof and a third conductor C3 is connected to a thermoelement 130 located centrally of the device. If the conductor C3 is connected to the positive side of a direct current supply it will be apparent that current will flow from the conductor C3 to the conductor C1 through the thermoelements therebetween and also in the direction from conductor C3 to the conductor C2 by means of the thermoelements interconnecting these conductors. If the arrangement of the thermoelectrically dissimilar thermoelements between the conductors C3 and C1 is such as to produce cooling junctions in the interior of the device, the thermoelements between the conductors C3 and C2 are also arranged to produce inner cooling junctions. As shown in FIGURE 9, the thermoelements are arranged so that current flow from conductor C3 to conductor C1 will be from a thermoelement 130 to a thermoelectrically dissimilar thermoelement 131. Since the conductor C3 connects to a thermoelement 130 joined to another thermoelement 130, current flow from the conductor C3 to conductor C2 will also be from a thermoelement 130 to a thermoelement 131. Hence, if the device is connected in circuit and current flows between C3 and C1 and also between C3 and C2, the inner thermojunctions throughout the length of the device will all be of the same character, that is, all are cooling junctions or all are heating junctions. It will therefore be apparent that the device 130 is comprised of two groups of theremoelements, one group between C3 and C1 and a second group between C3 and C2, which groups are electrically connected in parallel and joined with their bores in fluid communication with one another. Since the effective electrical resistance of the two groups is the resistance for the groups connected in parallel, and is substantially lower than the resistance of the groups connected in series, a much lower voltage is required to deliver the same amount of current through parallel connected groups than is required for series connected groups therefore effecting the same degree of heat transfer in the parallel group as in series connected groups and with a much smaller voltage. The use of a lower voltage permits more economical installation and obviates any safety hazards.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A fluid heating and cooling device comprising: a plurality of annular thermoelements, each having an end portion of reduced diameter and an end portion of larger diameter, said thermoelements being joined at their ends of corresponding diameters to define a tubular conduit adapted to pass fluid therethrough, a set of inner thermojunctions and a set of outer thermojunctions on said conduit representing the junctions of said reduced diameter thermoelement portions and of said large diameter thermoelement portions, respectively, adjacent ones of said thermoelements being thermoelectrically dissimilar; means for passing electric current through said thermoelements in a selected one of reciprocal directions, whereby in one direction of current flow the inner thermojunctions become cooling junctions for cooling fluid in said conduit and the outer thermojunctions become heating junctions and in the reverse direction of current flow the inner thermojunctions become heating junctions for heating fluid in said conduit and the outer thermojunctions become cooling junctions.

2. A fluid heating and cooling device comprising: a plurality of annular thermoelements, each having an end portion of reduced diameter and an end portion of larger diameter, said thermoelements being joined at their ends of corresponding diameters to define a tubular conduit adapted to pass fluid therethrough; a set of inner thermojunctions and a set of outer thermojunctions on said conduit representing the junctions of said reduced diameter thermoelement portions and said large diameter thermoelement portions, respectively, adjacent ones of said theremoelements being thermoelectrically dissimilar; means for electrically and thermally insulating the inner thermojunctions from the exterior of said device; means for electrically and thermally insulating the outer thermojunctions from the interior of said device; and means for passing electric current through said thermoelements in a selected one of reciprocal directions, whereby in one direction of current flow the outer thermojunctions become heating junctions and the inner junctions become cooling junctions for cooling fluid in said conduit and in the reverse direction of current flow the outer thermojunctions become cooling junctions and the inner thermojunctions become heating junctions for heating fluid in said conduit.

3. A fluid heating and cooling device comprising: a plurality of annular thermoelements, each having an end portion of reduced diameter and an end portion of larger diameter, said thermoelements being joined at their ends of corresponding diameters to define a tubular conduit adapted to pass fluid therethrough; a set of inner thermojunctions and a set of outer thermojunctions on said conduit representing the junctions of said reduced diameter thermoelement portions and said large diameter thermoelement portions, respectively, adjacent ones of said thermoelements being thermoelectrically dissimilar; an annular electrical and thermal insulating member disposed about each said inner thermojunction; an annular electrical and thermal insulating member disposed within each said outer thermojunction in concentric relation therewith; and means for passing electric current through said thermoelements in a selected one of reciprocal directions, whereby in one direction of current flow the outer thermojunctions become heating junctions and the inner junctions become cooling junctions for cooling fluid in said conduit and in the reverse direction of current flow the outer thermojunctions become cooling junctions and the inner thermojunctions become heating junctions for heating fluid in said conduit.

4. A fluid heating and cooling device comprising: a plurality of annular thermoelements, each having a cylindrical end portion of reduced diameter and a cylindrical end portion of larger diameter partially sleeved over said reduced diameter end portion and joined thereto by an annular flange portion, said thermoelements being joined at their ends of corresponding diameters to define a tubular conduit adapted to pass fluid therethrough; a set of inner thermojunctions and a set of outer thermojunctions on said conduit representing the junctions of said reduced diameter thermoelement portions and of said large diameter thermoelement portions, respectively, adjacent ones of said thermoelements being thermoelectrically dissimilar; an annular electrical and thermal insulating member disposed about each said inner thermojunction; and an annular electrical and thermal insulating member disposed within each said outer thermojunction in concentric relation therewith.

5. A thermoelectric system connectable with a fluid supply for cooling and heating fluids comprising: first and second tubular flow conductors, said first flow conductor having a set of inner cooling thermojunctions and a set of outer heating thermojunctions, said second flow conductor having a set of inner heating thermojunctions and a set of outer cooling thermojunctions; a jacket surrounding each said tubular conduit and spaced therefrom to define a chamber; a first pair of fluid supply conduits, each connected to one of said chambers and adapted to be connected with a supply of fluid for delivering fluid to said chambers; a third conduit communicating the chamber surrounding the first of said tubular flow conductors with the passage defined by the other flow conductor; and a fourth conduit communicating the chamber surrounding the second of said tubular flow conductors with the passage defined by said first flow conductor; and outlet means for controlling the flow of fluid through each of said tubular flow conductors when said first pair of conduits are connected to a supply of fluid.

6. A thermoelectric system connectable with a fluid supply for cooling and heating fluids comprising: first and second tubular flow conductors, said first flow conductor having a set of inner cooling thermojunctions and a set of outer heating thermojunctions, said second flow conductor having a set of inner heating thermojunctions and a set of outer cooling thermojunctions; means associated with each said flow conductor and defining with the exterior thereof, a chamber; a first pair of fluid supply conduits, each connected to one of said chambers and adapted to be connected with a supply of fluid for delivering fluid to said chambers; a third conduit communicating the chamber surrounding the first of said tubular flow conductors with the passage defined by the other flow conductor; and a fourth conduit communicating the chamber surrounding the second of said tubular flow conductors with the passage defined by said first flow conductor.

7. A thermoelectric system connectable with a fluid supply for cooling and heating fluids comprising: a pair of tubular flow conductors formed by a plurality of annular thermoelements, each thermoelement having an end portion of reduced diameter and an end portion of larger diameter, said thermoelements in each said flow conductor being joined at their ends of corresponding diameters; a set of inner and a set of outer thermojunctions on each said tubular conductor, said inner and outer thermojunctions representing the junctions of said reduced diameter portions and of said large diameter portions, respectively, adjacent ones of said thermoelements being thermoelectrically dissimilar; a jacket surrounding each said tubular flow conductor and spaced therefrom to define a fluid enclosing chamber; a first pair of conduits, each connected to one of said chambers and adapted to communicate one of said chambers with a supply of fluid; a second pair of conduits, each communicating a chamber surrounding one of said tubular flow conductors with the other of said flow conductors at one end thereof.

8. A thermoelectric system connectable with a fluid supply for cooling and heating fluids comprising: a pair of tubular flow conductors formed by a plurality of annular thermoelements, each thermoelement having an end portion of reduced diameter and an end portion of larger diameter, said thermoelements in each said flow conductor being joined at their ends of corresponding diameters; a set of inner and a set of outer thermojunctions on each said tubular conductor, said inner and outer thermojunctions representing the junctions of said reduced diameter portions and of said large diameter portions, respectively, adjacent ones of said thermoelements being thermoelectrically dissimilar; a jacket surrounding each said tubular flow conductor and spaced therefrom to define a fluid enclosing chamber; a first pair of conduits, each connected to one of said chambers and adapted to communicate one of said chambers with a supply of fluid; a second pair of conduits, each communicating a chamber surrounding one of said tubular flow conductors with the other of said flow conductors at one end thereof; and outlet means for controlling the flow of fluids through each of said tubular flow conductors.

9. A thermoelectric system connectable with a fluid supply for cooling and heating fluids comprising: first and second tubular flow conductors, said first flow conductor being disposed within said second flow conductor in spaced relation thereto and having a set of inner cooling thermojunctions and a set of outer heating thermojunctions, said second flow conductor having a set of inner heating thermojunctions and a set of outer cooling thermojunctions; means operatively associated with said flow conductors for causing fluid to be placed in heat conducting relation with the outer thermojunctions of said second flow conductor and then in heat conducting relation with the inner thermojunctions of said first flow conductor; and means operatively associated with said flow conductors for causing fluid to be placed in heat conducting relation with the outer thermojunctions of said first flow conductor and the inner thermojunctions of said second flow conductor, said first and second flow conductors having outlets for delivering cooled and heated fluid therefrom, respectively.

10. A fluid heating and cooling device comprising: a plurality of annular thermoelements, each having an end portion of reduced diameter and an end portion of larger diameter, said thermoelements being joined at their ends of corresponding diameters to define a tubular conduit adapted to pass fluid therethrough; a set of inner thermojunctions and a set of outer thermojunctions on said conduit representing the junctions of said reduced diameter thermoelement portions and said large diameter thermoelement portions and said large diameter thermoelement portions, respectively, adjacent ones of said thermoelements being thermoelectrically dissimilar; means for electrically and thermally insulating the inner thermojunctions from the exterior of said device; and means for electrically and thermally insulating the outer thermojunctions from the interior of said device; and a plurality of fins on the large diameter portions of said thermoelements and extending outwardly therefrom, said fins being adapted to readily transfer heat between the outer thermojunctions and fluid external of the device.

11. A fluid heating and cooling device comprising: a first group of annular thermoelements each having an end portion of reduced diameter and an end portion of larger diameter and joined at their ends of corresponding diameters to define a first tubular conduit adapted to pass fluid therethrough, adjacent ones of said thermoelements being thermoelectrically dissimilar to provide a first set of inner thermojunctions and first set of outer thermojunctions; a second group of annular thermoelements each having an end portion of reduced diameter and an end portion of larger diameter and joined at their ends to define a second tubular conduit, adjacent ones of said second group of thermoelements being thermoelectrically dissimilar to provide a second set of inner thermojunctions and a second set of outer thermojunctions, said first and second tubular conduits comprising said first and second groups of thermoelements being joined at one end by thermoelements which are thermoelectrically similar; and means for passing electric current through said first group of thermoelements in one direction of said flow passage and through said second group of thermoelements in the opposite direction of said flow passage thereby causing all of said inner thermojunctions to become thermoelectrically similar thermojunctions and all of said outer thermojunctions to become thermoelectrically dissimilar from said inner thermojunctions.

References Cited in the file of this patent
UNITED STATES PATENTS

| | | |
|---|---|---|
| 2,919,553 | Fritts | Jan. 5, 1960 |
| 2,928,253 | Lopp | Mar. 15, 1960 |
| 2,959,017 | Gilman | Nov. 8, 1960 |